(12) United States Patent
Myung et al.

(10) Patent No.: US 12,325,445 B2
(45) Date of Patent: Jun. 10, 2025

(54) HIGH-DEFINITION MAP-BASED LOCAL PATH PLANNING METHOD AND APPARATUS FOR DYNAMIC AND STATIC OBSTACLE AVOIDANCE

(71) Applicant: Korea Advanced Institute of Science and Technology, Daejeon (KR)

(72) Inventors: Hyun Myung, Daejeon (KR); Euigon Jung, Daejeon (KR); Wonho Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 266 days.

(21) Appl. No.: 18/101,169

(22) Filed: Jan. 25, 2023

(65) Prior Publication Data

US 2024/0001961 A1  Jan. 4, 2024

(30) Foreign Application Priority Data

May 31, 2022  (KR) .......................... 10-2022-0067049

(51) Int. Cl.
*B60W 60/00*  (2020.01)

(52) U.S. Cl.
CPC .... *B60W 60/0011* (2020.02); *B60W 60/0015* (2020.02); *B60W 2554/20* (2020.02); *B60W 2554/40* (2020.02); *B60W 2556/40* (2020.02)

(58) Field of Classification Search
CPC ................... G05D 2201/0212; B60W 2556/40
See application file for complete search history.

(56) References Cited

U.S. PATENT DOCUMENTS

| 12,077,181 | B1* | 9/2024 | Costantino | ......... B60W 60/0011 |
| 2021/0294333 | A1* | 9/2021 | Jing | ..................... B62D 15/021 |
| 2021/0373566 | A1* | 12/2021 | Agarwal | ......... B60W 30/18145 |
| 2022/0194419 | A1* | 6/2022 | Houshmand | ...... B60W 60/0023 |

(Continued)

FOREIGN PATENT DOCUMENTS

| CN | 111998867 A | * | 11/2020 | ......... G01C 21/3415 |
| CN | 112362074 A | * | 2/2021 | ......... G01C 21/3415 |

OTHER PUBLICATIONS

X. Hu, L. Chen, B. Tang, D. Cao, and H. He, "Dynamic path planning for autonomous driving on various roads with avoidance of static and moving obstacles," Mech. Syst. Signal Process., vol. 100, pp. 482-500, Feb. 2018.

(Continued)

*Primary Examiner* — Wade Miles
*Assistant Examiner* — Jerrod Irvin Davis
(74) *Attorney, Agent, or Firm* — Occhiuti & Rohlicek LLP

(57) ABSTRACT

Disclosed is a high-definition (HD) map-based local path planning method and apparatus for dynamic and static object avoidance. An HD map-based local path planning method for dynamic and static object avoidance performed by a computer device includes verifying a position on a global path by parameterizing the global path using an arc length; generating a path candidate group based on the global path; and selecting an optimal path as a path having a smallest cost function related to a global path following from the path candidate group. The cost function includes a global-path-following cost for selecting a path candidate group having a smallest lateral offset from the global path.

16 Claims, 10 Drawing Sheets

(56) References Cited

U.S. PATENT DOCUMENTS

2023/0242142 A1* 8/2023 Zhang ................ B60W 60/001
701/23

OTHER PUBLICATIONS

K. Chu, M. Lee, and M. Sunwoo, "Local path planning for off-road autonomous driving with avoidance of static obstacles," IEEE Trans. Intell. Transp. Syst., vol. 13, No. 4, pp. 1599-1616, Dec. 2012.
H. Wang, J. Kearney, and K. Atkinson, "Arc-length parameterized spline curves for real-time simulation," in Proc. 5th Int. Conf. Curves Surf., pp. 387-396, 2002.

* cited by examiner

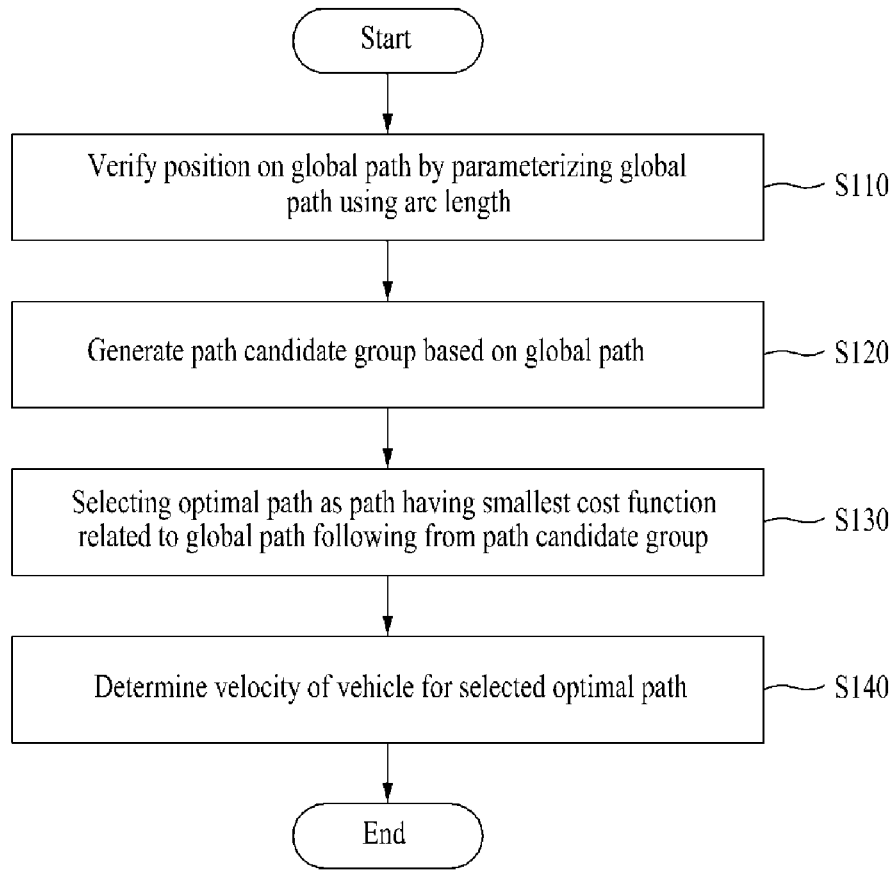
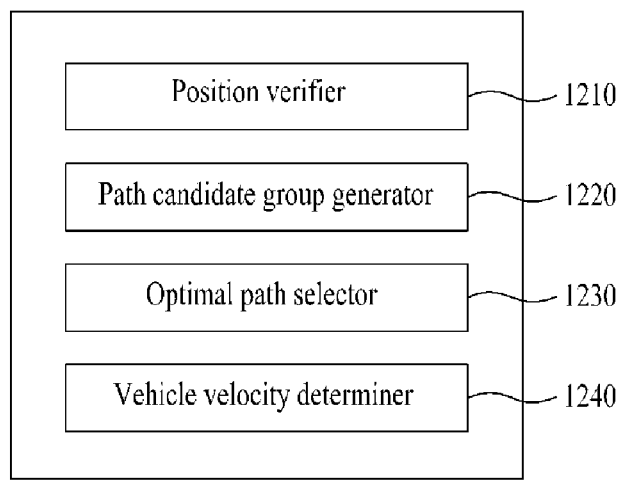

HIGH-DEFINITION MAP-BASED LOCAL PATH PLANNING METHOD AND APPARATUS FOR DYNAMIC AND STATIC OBSTACLE AVOIDANCE

CROSS-REFERENCE TO RELATED APPLICATION

This application claims the priority benefit of Korean Patent Application No. 10-2022-0067049, filed on May 31, 2022, in the Korean Intellectual Property Office, the disclosure of which is incorporated herein by reference.

BACKGROUND

1. Field of the Invention

The following description of example embodiments relates to a high-definition (HD) map-based local path planning method and apparatus for dynamic and static object avoidance.

2. Description of the Related Art

For autonomous driving, it is necessary to drive safely from a departure to a destination by recognizing surrounding environments and controlling a vehicle. In mobile robotics, path planning refers to a strategy for determining a method of achieving, by a mobile robot, a goal to avoid obstacles. To successfully achieve path planning and motion control, an autonomous robot needs to be able to safely reach its destination by detecting obstacles to avoid. Unlike such a mobile robot, an autonomous vehicle needs path planning that does not violate road traffic regulations in consideration of lanes and road environments. To this end, the autonomous vehicle is to generate a path using lane information and information around the vehicle based on a high-definition (HD) map generally having a centimeter-level accuracy.

Path generation includes global path planning and local path planning The global path planning uses all available information from the HD map, whereas the local path planning considers information around a vehicle only. The local path planning aims to find a path that maximally follows the global path planning while avoiding unexpected dynamic and static obstacles. An autonomous driving system using the HD map aims to avoid recognized obstacles around the vehicle while maximally following the corresponding path in a situation in which there is a global path to a destination.

Local path planning technology has been studied for a long time. Representative local path planning algorithms include a dynamic window approach (DWA) algorithm and a vector field histogram (VFH) algorithm.

The DWA algorithm refers to a velocity-based local path planning algorithm and computes an optimal velocity with no obstacle to a destination. The DWA algorithm has a feature that velocity is computed by converting from (x, y) Cartesian coordinates to (v, w) velocity system coordinates. Here, v denotes a translational velocity, and w denotes an angular velocity. Here, a pair having an optimal evaluation function is selected from among (v, w) pairs that do not collide with an obstacle within the window that considers a maximum acceleration, a maximum angular velocity, and a minimum angular velocity. A global dynamic window approach (GDWA) algorithm carries out route planning in consideration of a distance from each occupancy grid to a destination.

However, it is inefficient to perform computation on all the discretized grids to follow the global path. Since both the DWA algorithm and the GDWA algorithm do not reflect smoothness of a path, comfort of a driver and a passenger may decrease. The VFH algorithm generates a polar histogram and represents a surrounding environment divided into sectors, and determines an angle, a straight velocity, and steering according to a distribution of obstacles for each sector. VFH+ improved smoothness and stability of a path and generated a cost function-based path in consideration of a size of a robot. VFH* improved an issue coming from generation of a local path found in the existing VFH and VFH+ by merging A* algorithm. Algorithms derived from the VFH algorithm and the DWA algorithm may adjust steering to a final destination but may deviate from a global path after obstacle avoidance since a factor that follows global path planning is not included in an evaluation function. In particular, in the case of a vehicle that needs to obey traffic laws and lanes, the vehicle needs to drive to return to the global path after obstacle avoidance.

REFERENCES ARE AS FOLLOWS (Non-patent document 1) X. Hu, L. Chen, B. Tang, D. Cao, and H. He, "Dynamic path planning for autonomous driving on various roads with avoidance of static and moving obstacles," Mech. Syst. Signal Process., vol. 100, pp. 482-500, February 2018.

(Non-patent document 2) K. Chu, M. Lee, and M. Sunwoo, "Local path planning for off-road autonomous driving with avoidance of static obstacles," IEEE Trans. Intell. Transp. Syst., vol. 13, no. 4, pp. 1599-1616, December 2012.

(Non-patent document 3) H. Wang, J. Kearney, and K. Atkinson, "Arc-length parameterized spline curves for real-time simulation," in Proc. 5th Int. Conf. Curves Surf., pp. 387-396,2002.

SUMMARY

Example embodiments provide a high-definition (HD) map-based local path planning method and apparatus for dynamic and static object avoidance, and more particularly, provide technology capable of maximally finding a path that follows global path planning while avoiding unexpected dynamic and static obstacles when generating a local path.

Example embodiments provide an HD map-based local path planning method and apparatus for dynamic and static object avoidance that may generate a safe and efficient local path in complex road environments by providing a local path planning for an HD map-based road environment and dynamic and static object avoidance.

Also, example embodiments provide an HD map-based local path planning method and apparatus for dynamic and static object avoidance that may select an optimal path through an improved cost function by adding a global-path-following cost function and a kinematic cost function that considers a velocity of a dynamic obstacle and a velocity of an ego vehicle and may determine cut-in and following.

According to an aspect, there is provided an HD map-based local path planning method for dynamic and static object avoidance performed by a computer device, the method including verifying a position on a global path by parameterizing the global path using an arc length; generating a path candidate group based on the global path; and selecting an optimal path as a path having a smallest cost function related to a global path following from the path candidate group. The cost function includes a global-path-following cost for selecting a path candidate group having a smallest lateral offset from the global path.

The method may further include determining a velocity of a vehicle for the selected optimal path.

The verifying of the position on the global path may include interpolating waypoints of the global path generated based on the HD map into a cubic spline curve.

The verifying of the position on the global path may include expressing each waypoint corresponding to the global path as coordinates by parameterizing a position of a vehicle in a road environment with respect to the arc length.

The verifying of the position on the global path may include verifying the position on the global path by expressing a position of a vehicle as an arc length and a lateral offset with respect to the global path.

The generating of the path candidate group may include generating the path candidate group by applying a lateral offset based on the global path.

The generating of the path candidate group may include applying each path candidate group for vehicle control by converting from a Cartesian coordinate system to a curvilinear coordinate system.

The generating of the path candidate group may include determining, as an obstacle, an object that is not mapped to the HD map among objects determined through a sensor, computing a difference in the arc length from a current vehicle to each obstacle, and determining an arc length value of a path depending on presence or absence of the obstacle.

The cost function may include a static object cost, a smoothness cost, a global-path-following cost, and a dynamic object cost, and may be determined by adjusting an importance of each cost.

The selecting of the optimal path may include allowing driving by reflecting a cost function for a dynamic object and by planning a path that uses cut-in and following for the dynamic object.

According to another aspect, there is provided a high-definition (HD) map-based local path planning apparatus for dynamic and static object avoidance, the apparatus including a position verifier configured to verify a position on a global path by parameterizing the global path using an arc length; a path candidate group generator configured to generate a path candidate group based on the global path; and an optimal path selector configured to select an optimal path having a smallest cost function related to a global path following from the path candidate group. The cost function includes a global-path-following cost for selecting a path candidate group having a smallest lateral offset from the global path.

The apparatus may further include a vehicle velocity determiner configured to determine a velocity of a vehicle for the selected optimal path.

The position verifier may be configured to express each waypoint corresponding to the global path as coordinates by parameterizing a position of a vehicle in a road environment with respect to the arc length.

The position verifier may be configured to verify the position on the global path by expressing a position of a vehicle as an arc length and a lateral offset with respect to the global path.

The path candidate group generator may be configured to generate the path candidate group by applying a lateral offset based on the global path.

The path candidate group generator may be configured to determine, as an obstacle, an object that is not mapped to the HD map among objects determined through a sensor, to compute a difference in the arc length from a current vehicle to each obstacle, and to determine an arc length value of a path depending on presence or absence of the obstacle.

The cost function may include a static object cost, a smoothness cost, a global-path-following cost, and a dynamic object cost, and may be determined by adjusting an importance of each cost.

The optimal path selector may be configured to allow driving by reflecting a cost function for a dynamic object and by planning a path that uses cut-in and following for the dynamic object.

According to still another aspect, there is provided an HD map-based local path planning method for dynamic and static object avoidance performed by a computer device, the method including generating a path candidate group based on a global path; and selecting an optimal path as a path having a smallest cost function related to a global path following from the path candidate group by defining a cost function related to the global path following. The cost function includes a global-path-following cost for selecting a path candidate group having a smallest lateral offset from the global path.

The selecting of the optimal path may include allowing driving by reflecting a cost function for a dynamic object and by planning a path that uses cut-in and following for the dynamic object.

According to some example embodiments, there may be provided an HD map-based local path planning method and apparatus for dynamic and static object avoidance that may generate a safe and efficient local path in complex road environments by providing a local path planning for an HD map-based road environment and dynamic and static object avoidance.

Also, according to some example embodiments, there may be provided an HD map-based local path planning method and apparatus for dynamic and static object avoidance that may select an optimal path through an improved cost function by adding a global-path-following cost function and a kinematic cost function that considers a velocity of a dynamic obstacle and a velocity of an ego vehicle and may determine cut-in and following.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 11 is a flowchart illustrating a high-definition (HD) map-based local path planning method for dynamic and static object avoidance according to an example embodiment; and FIG. 12 is a diagram illustrating an HD map-based local path planning apparatus for dynamic and static object avoidance according to an example embodiment.

DETAILED DESCRIPTION

Figure 1:
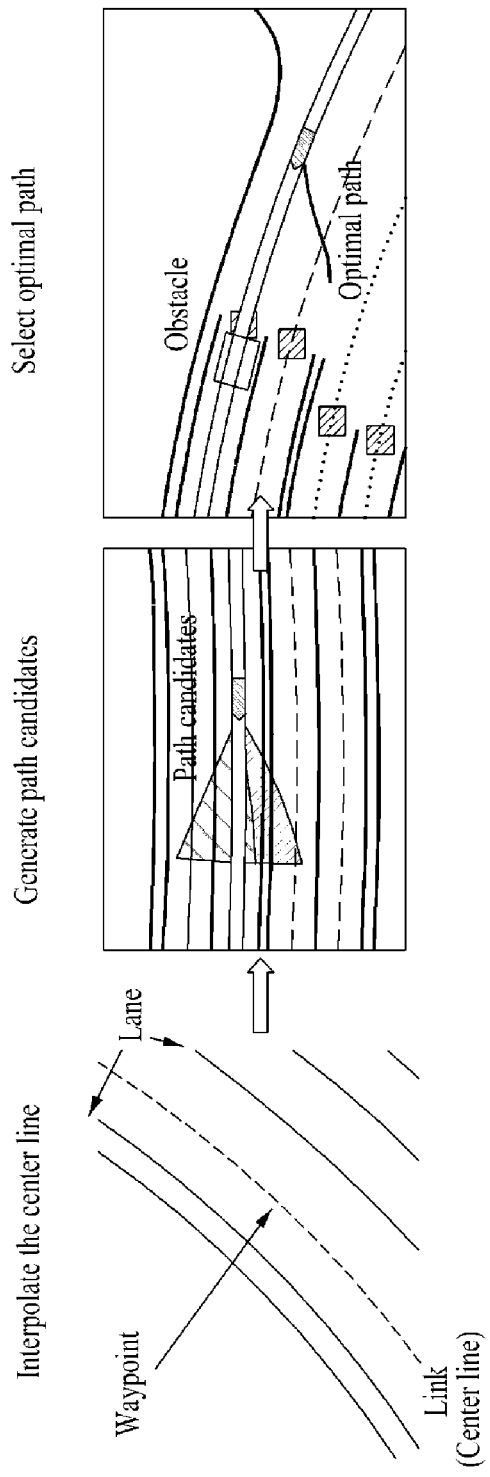
FIG. 1 illustrates a cost function-based curve path planning method according to an example embodiment.

Hereinafter, example embodiments are described with reference to the accompanying drawings. However, the example embodiments may be modified in other various forms and the scope of the present invention is not limited by the following example embodiments. Also, the example embodiments are provided to more fully explain the present invention to those skilled in the art. Shapes and sizes of components in the drawings may be exaggerated for clarity of description.

The following example embodiments relate to a high-definition (HD) map-based local path planning method and apparatus for dynamic and static object avoidance and to research regarding a local path planning part in global path planning and local path planning for generating a path of an autonomous vehicle.

The example embodiments propose an algorithm for generating a local path that follows global path planning in consideration of characteristics of an autonomous vehicle. Contributions according to the example embodiments are as follows. First, a cost function related to global planning following was defined to enable not destination-oriented driving but global-path-oriented driving. Second, a path using cut-in and following for a dynamic object was planned to enable realistic driving. Third, a path capable of avoiding obstacles in various situation was generated to improve stability.

FIG. 1 illustrates a cost function-based curve path planning method according to an example embodiment.

The example embodiments follow a global planning path, generate a safe and smooth local path based on an HD map, compute appropriate acceleration corresponding thereto. For a method of generating a path candidate group and determining an optimal path and velocity based on a cost function, reference was made to the existing technology (Non-patent documents 1 and 2) and a global-path-following cost function was added. Also, a cost function for a dynamic object was modified and applied to cut-in and following. Also, the stability was improved by generating a path such that there is no exceptional occasion for obstacle avoidance. Experiments were performed with the assumption that a global path is already generated based on a structural relationship between a lane and a waypoint of a link of the HD map.

Referring to FIG. 1, a method of generating a cubic spline curve based on a cost function is divided into three stages, 1) a stage of parameterizing a global path using an arc length, 2) a stage of generating a path candidate group, and 3) a stage of selecting an optimal path from the path candidate group.

Initially, waypoints of the global path are interpolated with a cubic spline curve. The path candidate group generates a plurality of cubic spline curves with a lateral offset from the global path and a position, a velocity, and a direction of a current vehicle. Then, the optimal path is selected from the path candidate group in consideration of a collision between static and dynamic objects, smoothness of an operation, and whether the global path is followed. A velocity of a corresponding path is determined after candidate group determination.

Parameterization of Global Path with Respect to Arc Length

Figure 2:
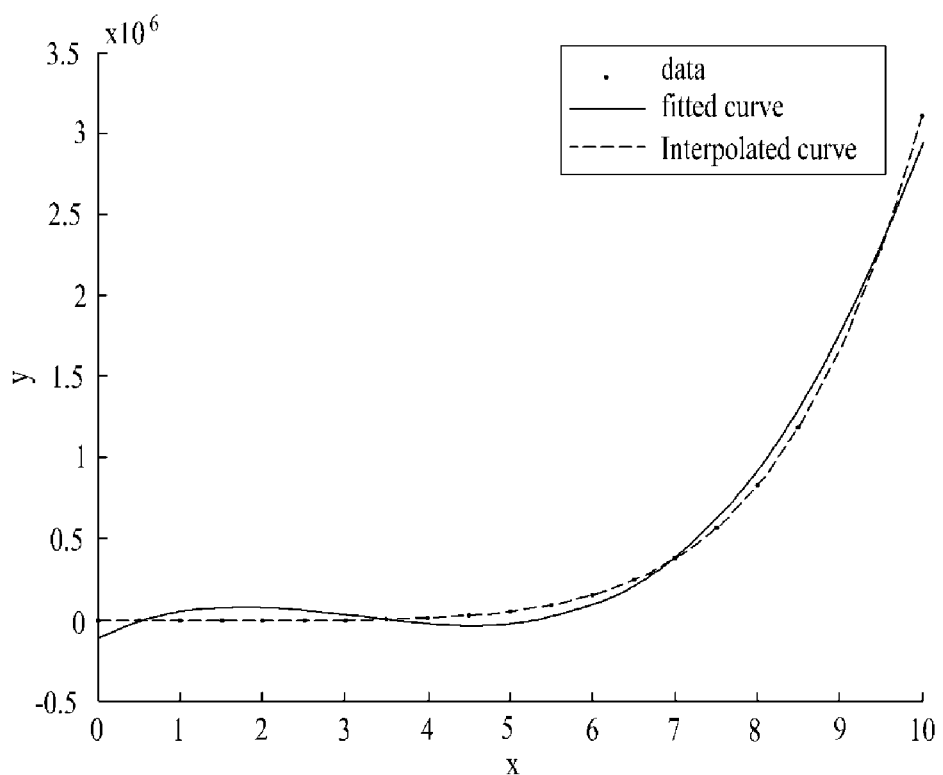
FIG. 2 is a graph showing a comparison between an interpolated curve and a fitted curve based on sample data points according to an example embodiment.

FIG. 2 is a graph showing a comparison between an interpolated curve and a fitted curve based on sample data points according to an example embodiment.

It is assumed that waypoints of a global path are generated based on an HD map. Since waypoints of the HD map are expressed with compactness and high accuracy, a curve interpolation was used rather than curve fitting. As shown in FIG. 2, in the case of using the curve interpolation, a following error may be reduced. A position in a road environment may be easily expressed through parameterization with respect to an arc length (Non-patent document 2). Therefore, x and y coordinates of each waypoint corresponding to the global path may be represented as Equation 1 (Non-patent document 3).

$$w(s)=(x(s), y(s)), 0 \le s \le L$$

$$x(s)=a_{xi}(s-s_i)^3+b_{xi}(s-s_i)^2+c_{xi}(s-s_i)^3+d_{xi}$$

$$y(s)=a_{yi}(s-s_i)^3+b_{yi}(s-s_i)^2+c_{yi}(s-s_i)^3+d_{yi} \qquad \text{[Equation 1]}$$

Here, s denotes the arc length and L denotes the entire arc length of the global path. (s) and (s) denote cubic spline equations that express arc segments by $\{s_0, s_1, \ldots, s_n\}$. Here, $s_0=0$ and $s_n=L$. $d_{xi}$ and $d_{yi}$ denote x and y coordinates at a start point $s_i$ of each arc segment. Therefore, interpolated x and y coordinates may be acquired by substituting the arc length into Equation 1 for all positions on the global path.

Also, a tangent angle and a curvature at a corresponding global path waypoint may be computed as Equation 2 and Equation 3, respectively.

$$\theta = \tan^{-1}\left(\frac{dy}{dx}\right) \qquad \text{[Equation 2]}$$

$$\kappa_{global} = \frac{\left(\frac{dx}{ds}\right)\left(\frac{d^2y}{ds^2}\right) - \left(\frac{d^2x}{ds^2}\right)\left(\frac{dy}{ds}\right)}{\left(\frac{dx}{ds}+\frac{dy}{ds}\right)^{1.5}} \qquad \text{[Equation 3]}$$

Verification of Position on Global Path

Figure 3:
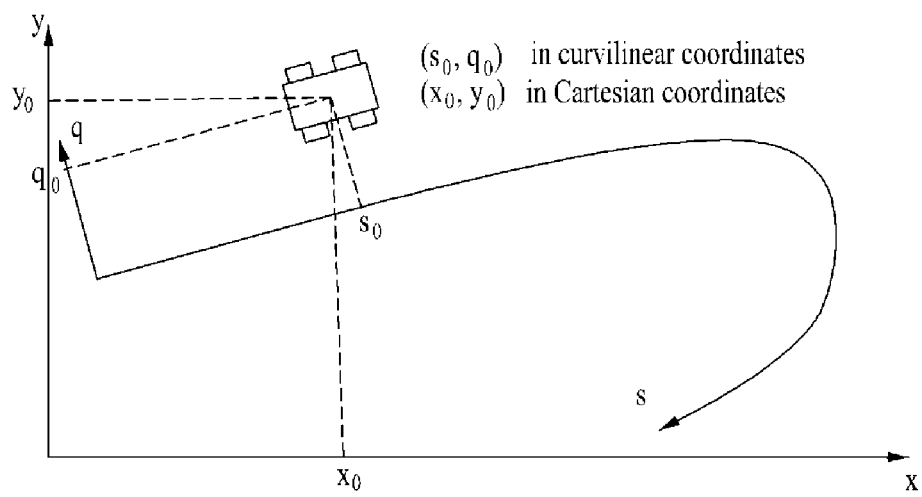
FIG. 3 is a graph showing a conversion from Cartesian coordinates to curvilinear coordinates according to an example embodiment.

FIG. 3 is a graph showing a conversion from Cartesian coordinates to curvilinear coordinates according to an example embodiment.

If a position of a current vehicle is expressed as a lateral offset and an arc length with respect to a global path, a position on the road may be more easily expressed. To this end, all the positions are converted from Cartesian coordinates to curvilinear coordinates as shown in FIG. 3. A closest distance $q_0$ from a position of the vehicle to a center line and a corresponding arc length $s_0$ may be acquired using quadratic minimization and Newton's method (Non-patent document 3). However, the proposed method computes only a distance and thus, is not sufficient to express a position from the center line. Therefore, referring to Table 1, it may be determined as a negative lateral offset ($-q_0$) when it is on the right side from a current center line and as a positive lateral offset ($+q_0$) when it is on the left side from the current center line based on a travelling direction of the vehicle.

TABLE 1

[Alg. 1]

Signed lateral distance from center line

Figure 4A:
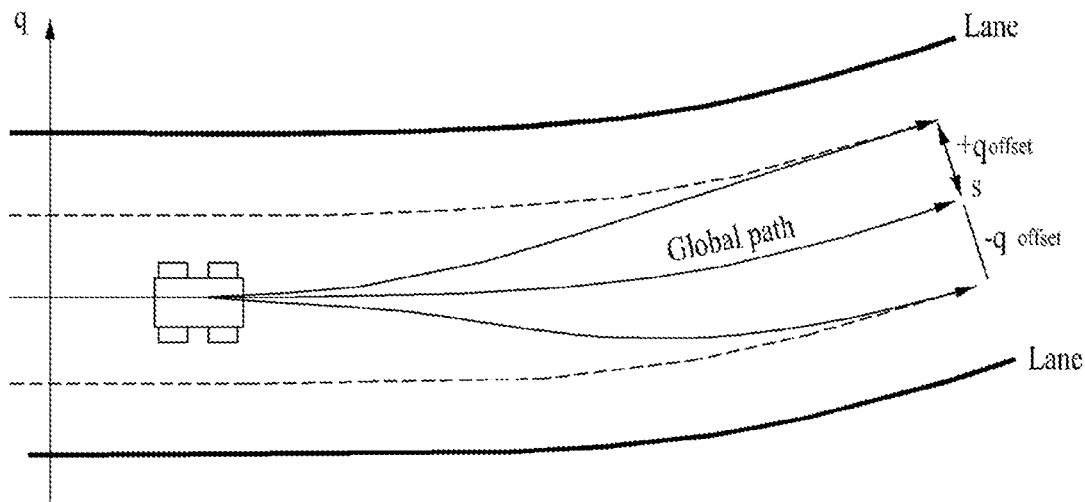
FIGS. 4a and 4b illustrate a path candidate generation for a global path according to an example embodiment.
Figure 4B:
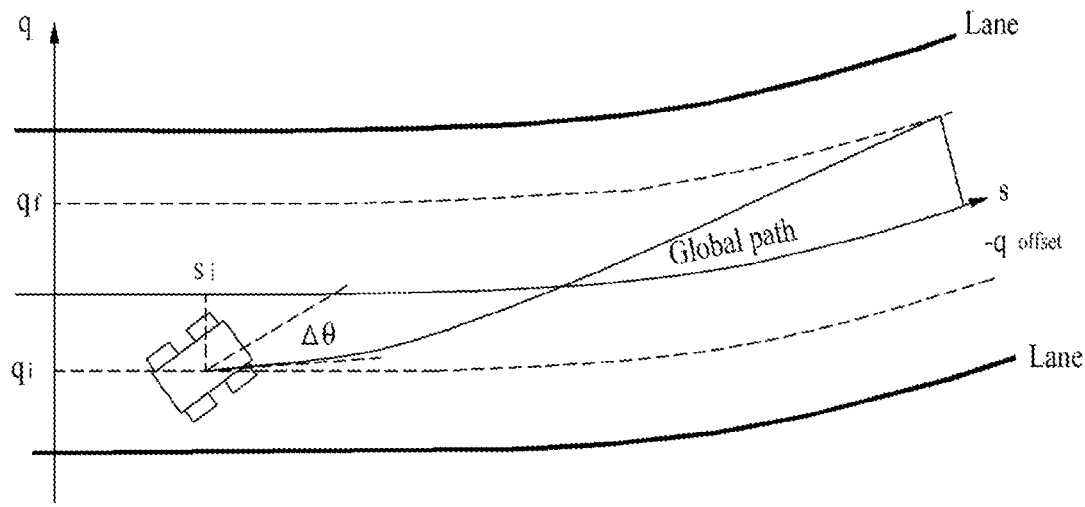

1. Input: arc length on the center line $s_0$, closest distance from a vehicle to center line $q_0$, vehicle position in the Cartesian coordinates ($x_0$, $y_0$)
2. Compute $x(s_0)$, $y(s_0)$ fom equation (1) where $s_i \leq s_c \leq s_f$
3. Compute $x(s_0 + \Delta s)$, $y(s_0 + \Delta s)$ from equation (1) where $\Delta s \ll (s_{i+1} - s_i)$
4. Compute
   $\Delta x = x(s_0 + \Delta s) - x(s_0)$,
   $\Delta y = y(s_0 + \Delta s) - y(s_0)$, $m_0 = \dfrac{\Delta y}{\Delta x}$, 5. if $\Delta x > 0$ && $\Delta y > 0$ or $\Delta x > 0$ && $\Delta y < 0$, i.e. first or fourth quadrant then
6.    if $y_0 - y(s_0) < m_0(x_0 - x(s_0))$ then
7.       return negative distance $-q_0$
8.    else
9.       return positive distance $+q_0$
10. else, i.e. second or third quadrant
11.    if $y_0 - y(s_0) < m_0(x_0 - x(s_0))$ then
12.       return positive distance $+q_0$
13.    else
14.       return negative distance $-q_0$ Generation of Path Candidate Group FIGS. 4a and 4b illustrate a path candidate generation for a global path according to an example embodiment.

A path candidate group is generated by applying a lateral offset based on the global path. Referring to FIG. 4a, a continuous path candidate group in which an end point of a path has a lateral offset of $+q_{offset}$ and $-q_{offset}$. The path candidate group may be expressed as Equation 4 of q for s with a cubic spline curve.

$$q(s) = \begin{cases} a(s-s_i)^3 + b(s-s_i)^2 + c(s-s_i) + q_i, & \text{if } s_i \leq s < s_f \\ q_f, & \text{if } s = s_f \end{cases} \quad \text{[Equation 4]}$$

In Equation 4, boundary conditions may be set to generate a candidate group according to coefficients a, b, and c of a cubic equation. Referring to FIG. 4b, $s_i$ and $q_i$ of a current vehicle may be computed. Here, $\Delta\theta$ denotes a difference between a direction of the vehicle and a tangent angle of a global path corresponding to a position of the vehicle. $\Delta s = s_f - s_i$ may be used to determine an arc length of the path candidate group, and $q_f$ and $q_i$ may be used to determine the global lateral offset. The boundary conditions may be expressed as Equation 5.

$$\begin{cases} q(s_i) = q_i, \\ q(s_f) = q_f, \\ \dfrac{dq}{ds}(s_i) = \tan(\Delta\theta), \\ \dfrac{dq}{ds}(s_f) = 0 \end{cases} \quad \text{[Equation 5]}$$

Based on the boundary conditions of Equation 5, cubic coefficients of the path candidate group may be determined. Each path candidate group may be converted from curvilinear coordinates to Cartesian coordinates based on Equation 2 and Equation 3 and thereby be applied to control the vehicle.

When generating a path, stability is an important factor to be considered. For stable driving, when a driving speed of a vehicle is fast, the path needs to be gentle and when the driving speed is slow, impact on the stability is small even though the path is steep. With the assumption that the path candidate group has the same lateral offset, a steepness of the path is determined according to an arc length $\Delta s$ of the path. Therefore, the arc length of the path needs to be determined according to a velocity of the vehicle as in Equation 6.

$$\Delta s_{vel} = \begin{cases} \Delta s_{min} + \dfrac{v^2}{|a_{min}|}, & \text{if } \Delta s_{min} + \dfrac{v^2}{|a_{min}|} < \Delta s_{max} \\ \Delta s_{max}, & \text{otherwise} \end{cases} \quad \text{[Equation 6]}$$

In Equation 6, $\Delta s_{min}$, $\Delta s_{max}$ denote a minimum arc length and a maximum arc length for lateral offset, respectively, v denotes a current velocity of the vehicle, and $a_{min}$ denotes a minimum acceleration of the vehicle. $\Delta s_{min}$ and $\Delta s_{max}$ are variables to be adjusted with experiment.

However, if the lateral offset is determined only with the velocity of the vehicle, serious problems may be encountered in object avoidance.

Figure 5A:
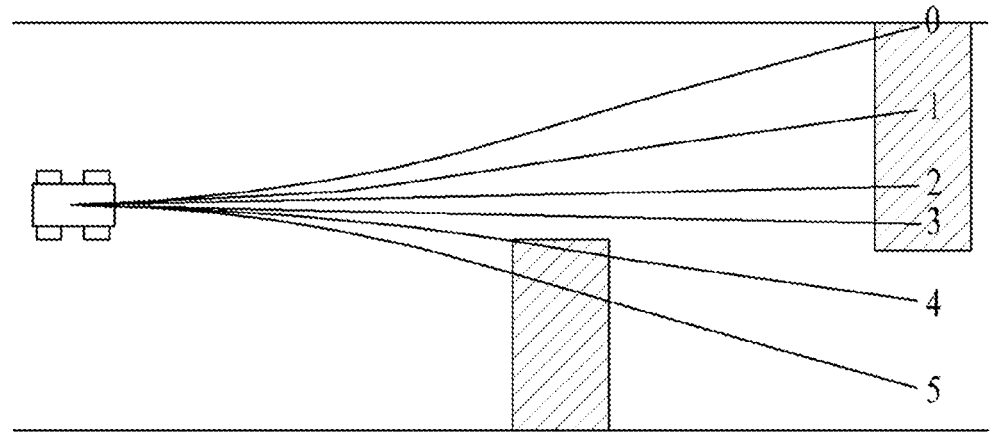
FIGS. 5a, 5b, and 5c illustrate an avoidance problem and solution to an exceptional occasion according to an example embodiment.
Figure 5B:
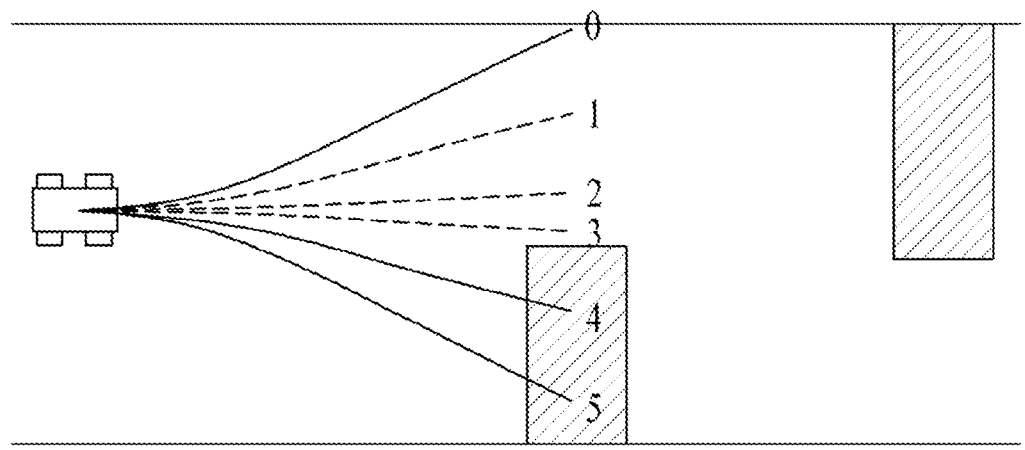
Figure 5C:
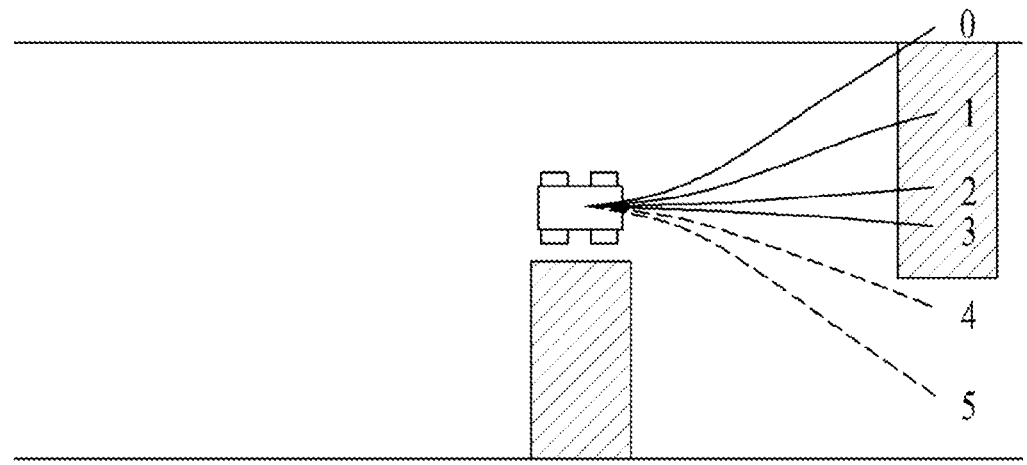

FIGS. 5a, 5b, and 5c illustrate an avoidance problem and solution to an exceptional occasion according to an example embodiment.

In a situation in which a static object is present on a path as shown in FIG. 5a, if a vehicle travels at a high speed, the entire path candidate group determines that the vehicle collides with an obstacle. A method of reducing an arc length of a path may be used only in such an exceptional occasion (Non-patent document 2), but it is a heuristic methodology that is difficult to generalize. Therefore, even though a stability is reduced, the arc length needs to be adjusted to avoid the obstacle.

Table 2 shows a process of determining an arc length value of a path depending on presence or absence of an obstacle.

TABLE 2

[Alg. 2]

Arc-length determination for obstacle avoidance

1. Input:    obj = $(obj_1, obj_2, \ldots, obj_m) \in$ Obj, $\delta = \{\ \}$
2. Output: arc length $\Delta s$ for path generation
3. Condition:

$\text{Avoid}(obj_i) = \begin{cases} 1, & \text{if } obj_i \text{ is an obstacle} \\ 0, & \text{otherwise} \end{cases}$ 4. for each $obj_i \in$ Obj
5.    if Avoid($obj_i$) == 1 then TABLE 2-continued

[Alg. 2]

Arc-length determination for obstacle avoidance

6.     Compute $\Delta s_{obs_i} = s_{obj_i} - s_{veh}$
7.     if $\Delta s_{obs_i} > 0$ then
8.         Insert $\Delta s_{obs_i}$ into $\delta$
9.     if $\delta$ is empty then
10.         Return $\Delta s_{vel}$
11.     else
12.         Find minimum arc-length-distanced obstacle
                $s_{obs} = \min(\delta)$
13.         Return $\Delta s = \min\{\Delta s_{obs}, \Delta s_{min}\}$ An object that is not mapped to an HD map, such as a lane and a curb, among objects Obj determined through a sensor is determined as an obstacle. A difference in the arc length from a current vehicle to each obstacle is computed. If the difference in the arc length is a positive number, a corresponding obstacle is present in a travelling direction of the vehicle and is to be avoided and thus, a value thereof is put in $\delta$. A smallest difference $\Delta s_{obs}$ in the arc length with the obstacle is found from $\delta$, and the arc length of path generation is determined as the smaller between $\Delta s_{obs}$ and $\Delta s_{min}$. If $\delta$ is empty, $\Delta s_{vel}$ is followed.

Referring to FIGS. 5a and 5b, when generating a path with an enhanced algorithm, the situation as shown in FIG. 5a may be avoided. Since an avoidance path may be generated from a moment at which an object is detected, the stability of avoidance may increase.

Selection of Optimal Path

A path with a smallest cost function is selected as an optimal path from a path candidate group. A cost function includes a static object cost (Non-patent document 1) $C_s$, a smoothness cost (Non-patent document 2) $C_{sm}$, a global-path-following cost $C_g$, and a dynamic object cost $C_d$ as in Equation 7. Importance of each corresponding cost may be adjusted using $w_s$, $w_{sm}$, $w_g$, $w_d$. i denotes an index corresponding to each path candidate.

$$C_{total}[i] = w_s C_s[i] + w_{sm} C_{sm}[i] + w_g C_g[i] + w_d C_d[i] + \quad \text{[Equation 7]}$$

The static object cost expresses a collision status between each path candidate and an obstacle as 0 and 1 and then performs a Gaussian convolution and is determined to have a lower cost as a distance from the obstacle increases (Non-patent document 2). Since lanes, curbs, and guardrails are also considered as obstacles, the cost is computed using information of an HD map.

The smoothness cost is used to select a path candidate that minimizes lateral acceleration. Assuming that a velocity of a vehicle is constant, a curvature is proportional to instantaneous centripetal acceleration. Therefore, the smoothness cost is defined by integrating the square of the curvature with respect to the path candidate and may be represented as Equation 8 (Non-patent document 2).

$$C_{sm}[i] = \int k_i^2(s) \, ds \quad \text{[Equation 9]}$$

The global-path-following cost is used to select a candidate having a smallest lateral offset from a global path. The cost function may be normalized to a value between 0 and 1 by dividing a sum of lateral offsets of path candidates in the path candidate group by the lateral offset of each candidate and may be represented as Equation 9.

$$C_g[i] = \frac{|q(s_{veh} + \Delta s)[i]|}{\sum_j |q(s_{veh} + \Delta s)[j]|} \quad \text{[Equation 9]}$$

In Equation 9, q(·)[i] denotes the same cubic spline curve of an $i^{th}$ path candidate as Equation 4. $q(s_{veh}+\Delta s)[i]$ denotes a value acquired by changing $s_i$ with a current arc position s veh of a vehicle on the global path and substituting the same into Equation 4 as a lateral offset of a corresponding path candidate.

Figure 6A:
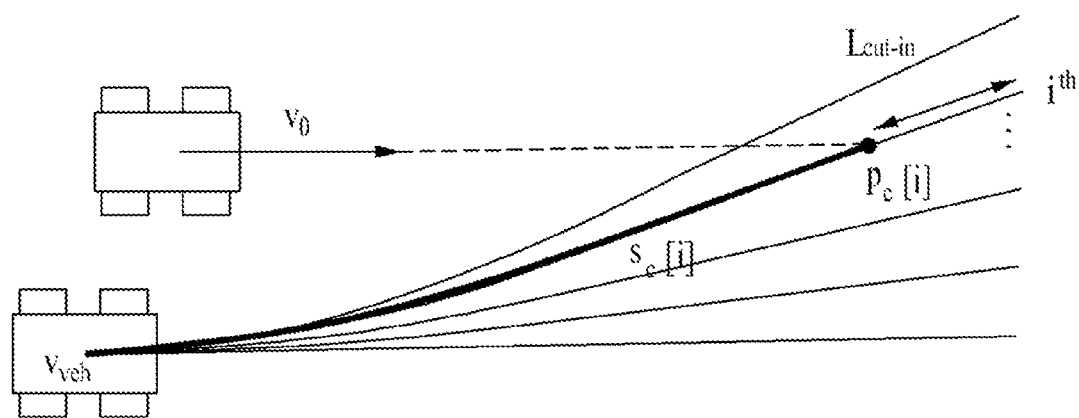
FIGS. 6a and 6b illustrate an example of a collision between a generated path and a dynamic obstacle according to an example embodiment.
Figure 6B:
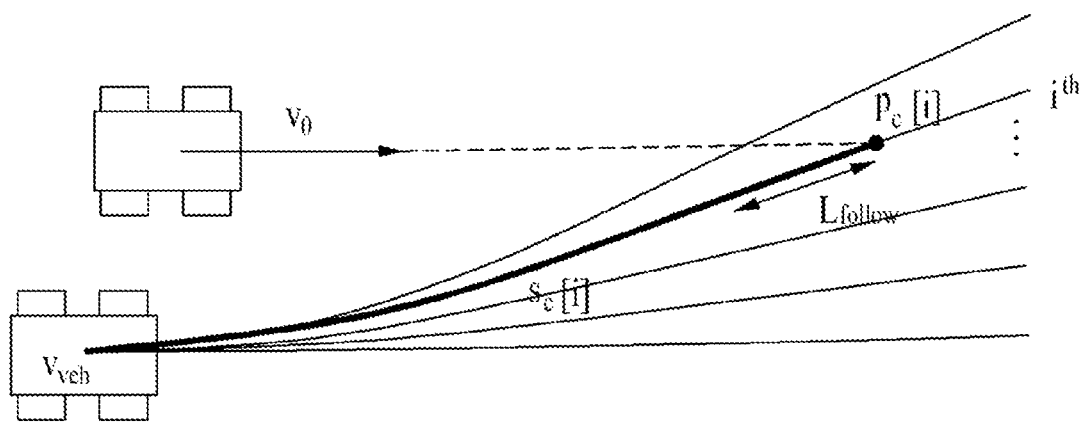

FIGS. 6a and 6b illustrate an example of a collision between a generated path and a dynamic obstacle according to an example embodiment The dynamic object cost is used to select an optimal path in consideration of a velocity and a travelling direction of a dynamic object (Non-patent document 1). Referring FIGS. 6a and 6b, a dynamic object is travelling at velocity vector $\vec{v}_o$ and reaches a position p[i] on an $i^{th}$ path in $t_{obs}[i]$ seconds. If a path distance from a position of a current vehicle to an arrival point, that is, the position p[i] is $s_c[i]$ and a velocity of the current vehicle is $v_{veh}$, a time $t_{veh}[i]$ used until a collision may be computed according to Equation 10.

$$t_{veh}[i] = \frac{s_c[i]}{v_{veh}} \quad \text{[Equation 10]}$$

$$\Delta t[i] = t_{obs}[i] - t_{veh}[i] \quad \text{[Equation 11]}$$

Cut-in or following is determined based on a time difference $\Delta[i]$ between a collision time with a path and a time used to drive to a collision point of the vehicle. Assuming that the vehicle maintains a current velocity, cut-in is possible if $\Delta t$ is a positive number and following is possible if $\Delta t$ is a negative number. If $\Delta t = 0$, following is determined. FIG. 6a shows an example of a situation in which cut-in is possible through the $i^{th}$ path. Acceleration required for cut-in in front by $L_{cut-in}$ through the $i^{th}$ path may be computed with Equation 12. The dynamic object cost of the corresponding path may be computed with Equation 13 with respect to acceleration and a travel distance required for cut-in. If $s_c[i] + L_{cut-in} - v_{veh} t_{obs}[i] \leq 0$ in Equation 12, cut-in is sufficiently possible with the current velocity and acceleration is 0 accordingly. Otherwise, the acceleration may be computed with a basic kinematic equation.

$$a[i] = \begin{cases} 0, & \text{if } s_c[i] + L_{cut-in} - v_{veh} t_{obs}[i] \leq 0 \\ 2\left(\frac{s_c[i] + L_{cut-in} - v_{veh} t_{obs}[i]}{t_{obs}[i]^2}\right), & \text{otherwise} \end{cases} \quad \text{[Equation 12]}$$

$$C_d[i] = |a[i]|(s_c[i] + L_{cut-in}) \quad \text{[Equation 13]}$$

FIG. 6b shows an example of a situation in which following is possible through the $i^{th}$ path. When following by distance of $L_o$ through the $i^{th}$ path, $L_{follow}$ that considers Ail may be computed with Equation 14. Acceleration to set a $L_{follow}$ distance difference may be computed with Equation 15. The dynamic object cost of a corresponding path may be represented as Equation 16.

$$L_{follow} = \begin{cases} L_o, & \text{if } L_o \leq s_c[i] \\ s_c[i], & \text{otherwise} \end{cases} \quad \text{[Equation 14]}$$

$$a[i] = 2\left(\frac{s_c[i] - L_{follow} - v_{veh} t_{obs}[i]}{t_{obs}[i]^2}\right) \quad \text{[Equation 15]}$$

$$C_d[i] = |a[i]|(s_c[i] - L_{follow}) \quad \text{[Equation 16]}$$

Setting of Target Velocity

The target velocity is determined as a slowest velocity among maximum velocity $v_{limit}$ specified on the road, velocity $v_k$ according to a curvature of a selected path, and velocity $v_s$ according to the static object cost (Non-patent document 1). The velocity according to the curvature may be represented as Equation 17 and the velocity according to the static object may be represented as Equation 18.

$$v_\kappa = \sqrt{\frac{|a_{lat}|_{max}}{\max \kappa(\text{path})}} \qquad [\text{Equation 17}]$$

$$v_s = \left(1 - k_s C_s^2(\text{path})\right) v_{ref} \qquad [\text{Equation 18}]$$

Here, $|a_{lat}|_{max}$ denotes a variable changeable according to a driving style as a maximum lateral acceleration and max(path) denotes a maximum curvature of the selected path. $C_s$(path) denotes the static object cost of the selected path and is used for velocity selection to drive at a slow velocity in a narrow space that is surrounded by obstacles. $k_s$ denotes an amplification value for the static object cost, and $v_{ref}$ denotes a reference velocity for the selected path, and both are variables that may be set through experiment.

Hereinafter, experiments and results are described.

Experiments of example embodiments were conducted in a robot operation system (ROS) environment and simulation results were visualized using an RVIZ tool of a ROS. Driving of a vehicle and a static object was performed through path-following using a model predictive control (MPC). The MPC refers to a method of predicting and optimizing output during a specific period in the future based on a modeled system. Path-following using the MPC follows a path by computing a control value that reduces a cost function for a forward waypoint to move within constraints. A cost function is defined based on a difference between a velocity at each forward waypoint and a reference velocity, a steering angle, acceleration, and a change in steering angle and acceleration between two consecutive waypoints, and the steering angle and the acceleration of each waypoint that minimizes the cost function are computed. The aforementioned acceleration and target velocity for cut-in and following were used as constraints of a controller.

The corresponding experiments were conducted based on the 2019 Daegu autonomous driving special district HD map provided by the National Geospatial Information Platform. In the simulation, a red rectangle represents a vehicle that executes path planning and a red dotted line represents a trajectory of the vehicle. A black line represents a lane on an HD map. A green dotted line on a lane denotes a planned global path and a path candidate group is generated accordingly. A red line in the path candidate group represents an excluded path due to a collision risk and a green line represents a drivable path. Here, a blue line represents a selected optimal path and a path followed using MPC. Static and dynamic obstacles are represented using dark gray ellipses and a light gray buffer is generated in consideration of a size of the vehicle. A maximum velocity of the vehicle is set according to the road in which the vehicle is currently located based on the HD map and the maximum velocity of the road on which the experiments were conducted is all 50 km/h. The maximum acceleration and minimum acceleration of the vehicle are set to 1 m/s² and −3 m/s², respectively. Table 3 shows parameter values used for the experiments.

TABLE 3

| | |
|---|---|
| $|a_{lat}|_{max}$ | 5.0 m/s² |
| $k_s$ | 0.8 |
| $\Delta s_{min}$ | 10.0 m |
| $\Delta s_{max}$ | 50.0 m |
| $v_{ref}$ | 50 km/h |

Avoidance of Static Object

Figure 7A:
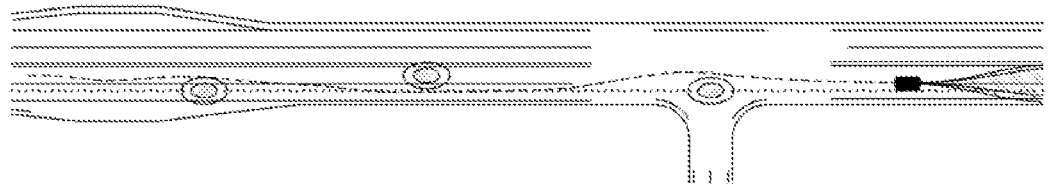
FIGS. 7a, 7b, and 7c illustrate results of following a global path by avoiding a static object according to an example embodiment.
Figure 7B:
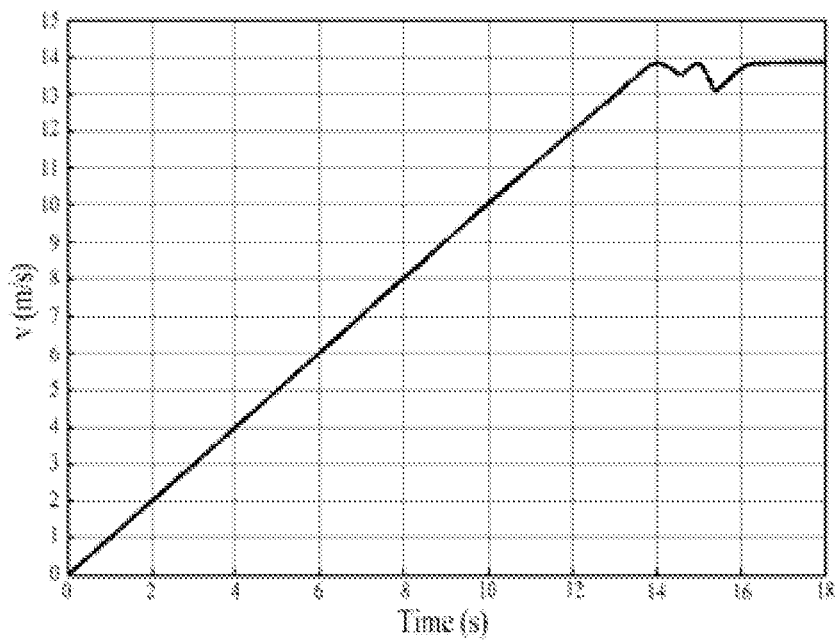
Figure 7C:
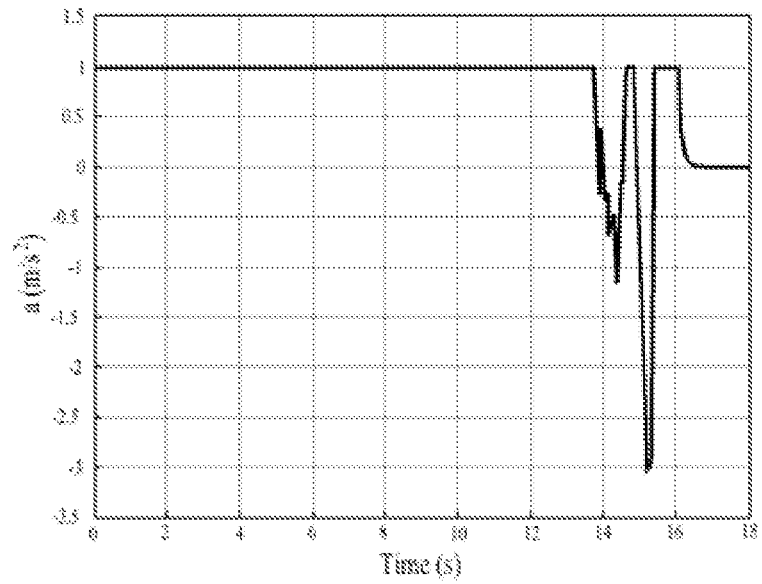

FIGS. 7a, 7b, and 7c illustrate results of following a global path by avoiding a static object according to an example embodiment.

FIGS. 7a, 7b, and 7c show results of following a global path by avoiding a plurality of static objects. Referring to FIGS. 7a, 7b, and 7c, since a starting velocity starts at 0 m/s, a vehicle starts travelling with the maximum acceleration. It can be seen that obstacles on the global path were verified and avoided while travelling on a path that follows the global path by a global-path-following cost. Since the vehicle did not reach a target velocity until a third obstacle was avoided, the vehicle made avoidance with the maximum acceleration. However, when avoiding the third obstacle, the vehicle returned to the global path when deviating from the global path and after avoidance and decelerated.

FIGS. 8a, 8b, 8c and 8d illustrate generation of an avoidance path according to an example embodiment.

Figure 8A:
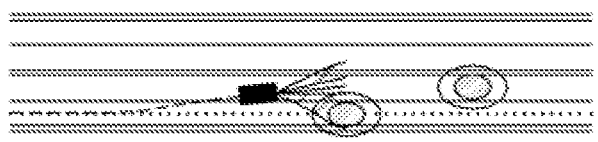
FIGS. 8a, 8b, 8c and 8d illustrate generation of an avoidance path according to an example embodiment.
Figure 8B:
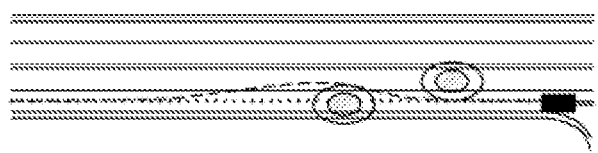
Figure 8C:
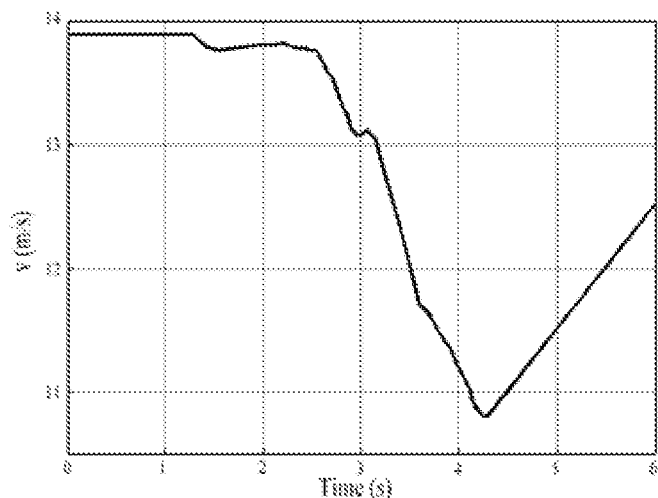
Figure 8D:
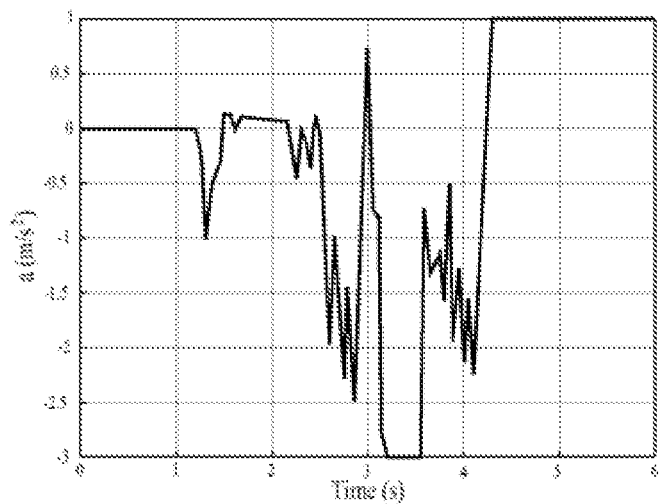

FIGS. 8a, 8b, 8c and 8d illustrate generation of an avoidance path in which the problem raised in FIG. 5a is solved. Referring to FIG. 8a, a length of a path candidate group generated according to an algorithm of Table 2 is set to a distance from a closest obstacle and a problem that all the paths are blocked by a second obstacle may be avoided (Non-patent document 2). Also, since a path is generated to avoid obstacles, rapid avoidance may be prevented. A first obstacle may be safely avoided even with deceleration of −1 m/s² and sudden appearance of the second obstacle may be handled.

Avoidance of Dynamic Object

Experiments on an avoidance status in a scenario in which a dynamic object interferes with driving when changing a lane to follow a global path were conducted. Table 4 shows variable values used for the experiments.

TABLE 4

| | |
|---|---|
| $L_{follow}$ | 5.0 m |
| $L_{cut-in}$ | 5.0 m |

Figure 9:
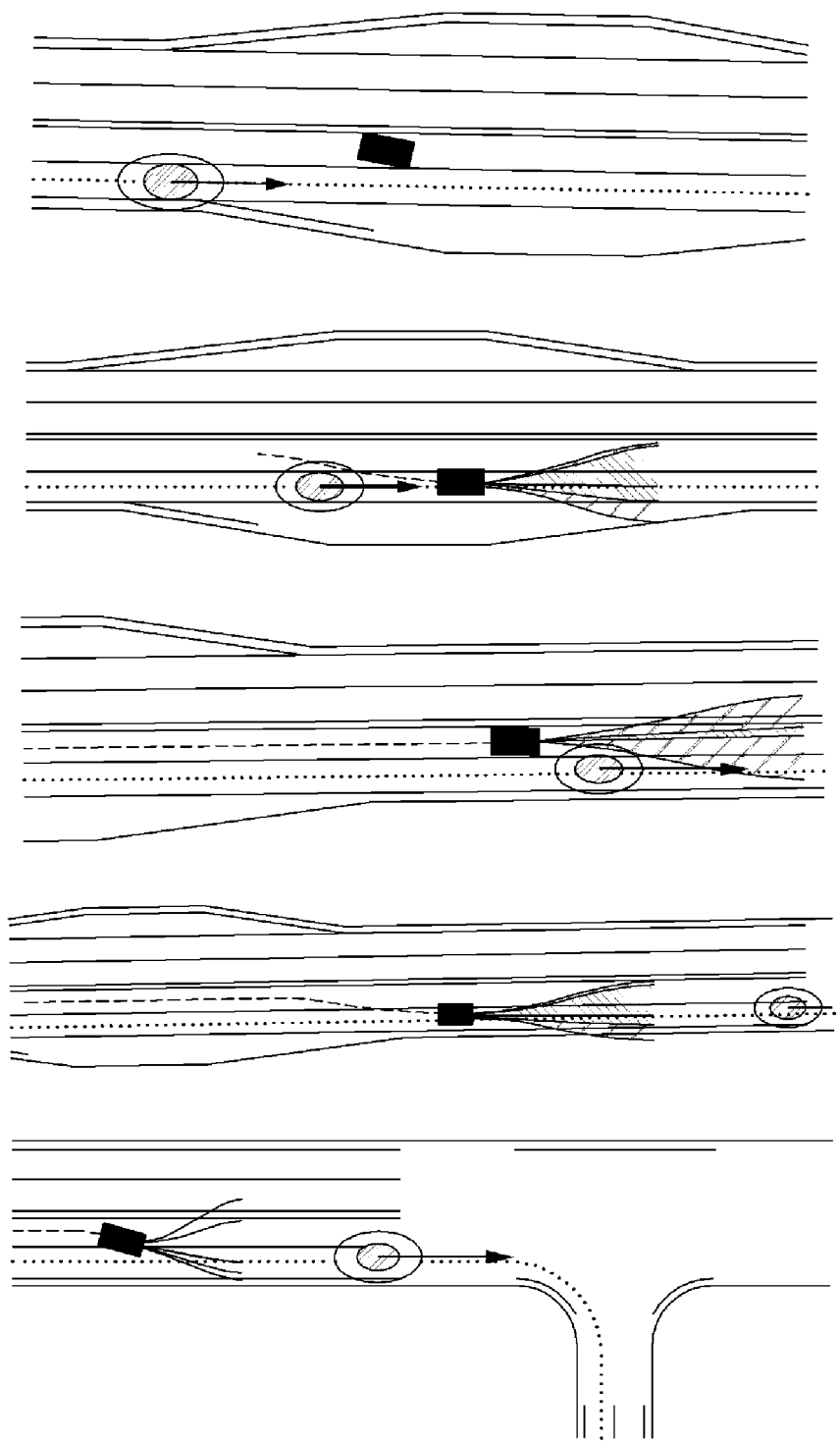
FIG. 9 illustrates a trajectory of a vehicle according to a velocity of a dynamic object according to an example embodiment.

FIG. 9 illustrates a trajectory of a vehicle according to a velocity of a dynamic object according to an example embodiment.

The first part of FIG. 9 shows a simulation setting in which an ego vehicle initially travelling at 7 m/s is located astray from a global path and a dynamic object is approaching toward the ego vehicle on the global path. In the second part of FIG. 9, although a velocity (10 m/s) of the dynamic object is faster than a velocity of the vehicle (7 m/s), the dynamic object is located behind the vehicle and thus, cut-in is determined to be possible. The fourth part of FIG. 9 shows that the vehicle is following the dynamic object since a velocity difference between the vehicle and the dynamic object is great.

The third part of FIG. 9 shows a phenomenon that the vehicle does not change a lane to the global path when the velocity of the vehicle is similar to the velocity of the dynamic object. This phenomenon may cause great deviation from the global path on a real road. For example, referring to the fifth part of FIG. 9, the vehicle may pass without changing a lane to the global path when the vehicle needs to make a right turn. This may be solved by determining a target velocity of the vehicle based on a curvature of a forward global path of the vehicle. Referring to the fifth part of FIG. 9, following is performed after sending the dynamic object through deceleration in consideration of a curvature of a turn section.

Avoidance of Static and Dynamic Objects

Experiments on a case in which static and dynamic objects simultaneously obstruct a path were conducted.

Figure 10A:
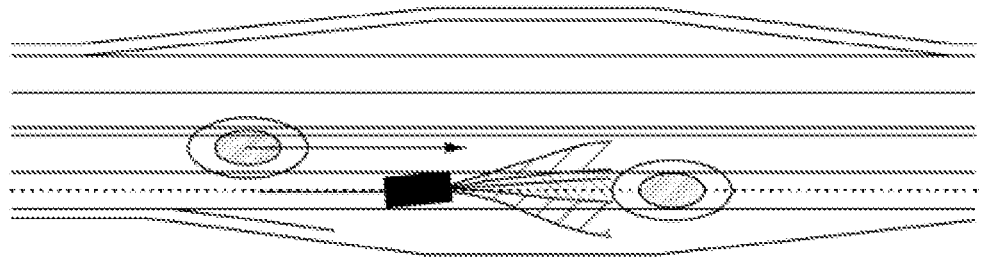
FIGS. 10a and 10b illustrate results when a static object is on a global path and a dynamic object approaches on a left lane according to an example embodiment.
Figure 10B:
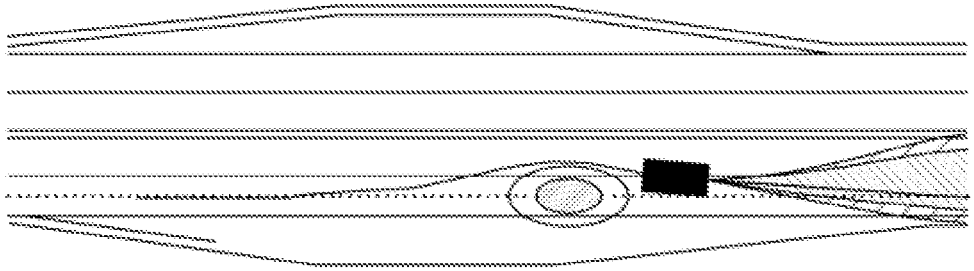

FIGS. 10a and 10b illustrate results when a static object is on a global path and a dynamic object approaches on a left lane according to an example embodiment.

A vehicle is initially travelling at 2.0 m/s and the dynamic object is travelling at 15 m/s. Referring to FIG. 10a, the vehicle tries to verify and avoid a collision with the static object in a path candidate that follows the global path. A path candidate group that disallows deceleration with the minimum acceleration among paths that avoid to a left lane is excluded. A path that allows deceleration with the minimum acceleration, most safely avoids the static object, and maximally follows the global path is selected from a group of remaining path candidates. Referring to FIG. 10b, it can be seen that the static object is safely avoided after sending the dynamic object.

Path Planning Time

In this experiment, a simulation vehicle was driven along a global path with a length of about 400 meters on a round-trip two-lane road. Vehicle specifications and environment settings are shown in Table 5.

TABLE 5

| Parameter | Definition | Value |
| --- | --- | --- |
| $|a_{lat}|_{max}$ | Maximum lateral acceleration | 5.0 m/s$^2$ |
| $a_{long_{max}}$ | Maximum longitudinal acceleration | 1.0 m/s$^2$ |
| $a_{long_{min}}$ | Minimum longitudinal acceleration | −3.0 m/s$^2$ |
| $v_{max}$ | Maximum speed | 50 km/h |

All the following experiments were conducted in an environment with Intel Core i7-8700 CPU (12 core, 3.2 GHz) and 16 GB RAM. Since the proposed path planning algorithm needs to compute cost for each path candidate, complexity is determined according to the number of and a length of path candidates included in a path candidate group (Non-patent document 2). In this experiment, 70 path candidates were generated according to the above settings. Time used for a path generation and a path selection according to a path length are compared as shown in Table 6.

TABLE 6

| Path length (m) | Path generation (ms) | Path selection (ms) | Execution time (ms) |
| --- | --- | --- | --- |
| 10 | 46 | 4 | 50 |
| 30 | 83 | 11 | 94 |
| 50 | 129 | 39 | 168 |

Each result shows an average value over 100-second simulation. Table 6 shows an increase in an amount of computation according to an increase in a path length. This phenomenon occurs due to an increase in the number of waypoints to be verified for a collision with an obstacle. It was found that the number of obstacles to be compared for a collision is a main factor that causes a degradation in performance of a local path generation algorithm. In a real road environment, a center line and a curb are main considerations in absence of a neighboring vehicle. Since a center line and curbs are expressed as dense dots on an HD map, a large amount of computation is required to determine a collision status with each path.

Table 7 shows results of comparing a path planning time between a proposed algorithm and other algorithms when a static object, such as a lane and a curb, are included in a map and when the static object is not included in the same experiment environment.

TABLE 7

| | Computation time (ms) |
| --- | --- |
| DWA[7] (w/o) | 1 |
| Frenét[17] (w/o) | 51 |
| Proposed (w/o) | 43 |
| DWA (w/) | 130 |
| Frenét (w/) | 104 |
| Proposed (w/) | 56 |

The number of points corresponding to a center line and a curb around a vehicle is about 1,400 and an average computation time when travelling for 100 seconds was compared. Although variables of the respective algorithms are different, path candidate groups were generated with the same number and the same resolution and the comparison was performed under the same conditions. Since a DWA algorithm considers not global path following but an arrival point only and generates a path candidate group using a window method, a large amount of computation is not required. Therefore, the DWA algorithm shows the fastest computation time when there is no static obstacle, but is determined as the heaviest algorithm when the static object is present. Due to characteristics of the DWA algorithm that tries to be maximally away from the static object, the DWA algorithm shows performance unstable for HD map-based autonomous driving since the vehicle travels in the center while stepping on a lane on a one-way two-lane road. A Frenét frame trajectory generation method is directly installed and tested on an autonomous vehicle and is evaluated as an algorithm very suitable for autonomous driving. After generating a path expressed as a quartic polynomial and a quintic polynomial in consideration of a velocity, an acceleration, and an angular velocity in a lateral direction and a longitudinal direction in Frenét coordinates, a path having a smallest cost function is selected. The Frenét algorithm shows a faster computation speed than the DWA algorithm when the static object is present and is more suitable for autonomous driving in terms of following the global path. However, requiring a large amount of computation to compute a collision with the static object shows the limit of real-time performance. The proposed algorithm generates a path candidate group with a lateral offset, which is similar to the Frenét algorithm, but determines a single longitudinal direction in consideration of a velocity of a current vehicle, a curvature of a subsequent path, and a distance from an obstacle to be avoided. Since a smooth and global-path-following local path is selected by defining a cost function that is lightweight in computation, the proposed algorithm has a faster computation time than the Frenét algorithm. Also, using characteristics of a road on which a collision with a lane and a curb frequently occurs in a latter part of the path, an amount of computation used for a collision status is greatly reduced.

The example embodiments propose a local path generation algorithm that avoids static and dynamic objects and follows a global path. Since a generated HD map is used, it is easy to identify an object absent on the map. Also, since an object present on the map has a small positional error, it is possible to quickly generate a precise local path. The algorithm proposed in the example embodiments proceeds in order of coordinate system conversion for the global path, generation of a path candidate group, and cost-based path selection. A path is selected through the defined cost function such that a static obstacle is avoided with as much space as possible and a dynamic obstacle is avoided with following and cut-in. A computation speed of the algorithm is also suitable for real-time path generation. Parameters introduced in the example embodiments were set through experiments, but the algorithm may be improved to find a robust optimal parameter value from a plurality of scenarios through reinforcement learning in the future. In the example embodiments, the experiments were conducted with the assumption that a dynamic object maintains a current velocity and path as is, but the proposed algorithm is robust even when a direction and a velocity of the dynamic object change. Therefore, a verification experiment thereof is planned to be conducted in the future.

Hereinafter, a method and apparatus for generating a local path that avoids static and dynamic objects and follows a global path using the aforementioned local path generation algorithm that avoids the dynamic and static objects and follows the global path is described.

FIG. 11 is a flowchart illustrating an HD map-based local path planning method for dynamic and static object avoidance according to an example embodiment.

Referring to FIG. 11, an HD map-based local path planning method for dynamic and static object avoidance performed by a computer device may include operation S110 of verifying a position on a global path by parameterizing the global path using an arc length, operation 120 of generating a path candidate group based on the global path, and operation S130 of selecting an optimal path as a path having a smallest cost function related to a global path following from the path candidate group. Here, the cost function may include a global-path-following cost for selecting a path candidate group having a smallest lateral offset from the global path.

Also, the method may further include operation S140 of determining a velocity of a vehicle for the selected optimal path.

Path planning needs to be performed to detect an obstacle and safely reach a target point in autonomous driving. In particular, an autonomous vehicle requires path planning that considers lanes and road environments and does not violate road traffic regulations. To this end, the autonomous vehicle generally uses a method of generating a path using lane information and information around the vehicle based on an HD map having a centimeter-level accuracy.

The example embodiments aim to find a path that maximally follows global path planning while avoiding unexpected dynamic and static obstacles when generating a local path.

The HD map-based local path planning method for dynamic and static object avoidance according to an example embodiment will be described using, for example, an HD map-based local path planning apparatus for dynamic and static object avoidance according to an example embodiment.

FIG. 12 is a diagram illustrating an HD map-based local path planning apparatus for dynamic and static object avoidance according to an example embodiment.

Referring to FIG. 12, an HD map-based local path planning apparatus 1200 for dynamic and static object avoidance may include a position verifier 1210, a path candidate group generator 1220, and an optimal path selector 1230. The HD map-based local path planning apparatus 1200 for dynamic and static object avoidance may further include a vehicle velocity determiner 1240.

In operation S110, the position verifier 1210 may verify a position on a global path by parameterizing the global path using an arc length. Example embodiments may plan a path in consideration of a lane in a road environment.

The position verifier 1210 may interpolate waypoints of the global path generated based on an HD map into a cubic spline curve. Here, the position verifier 1210 may express each waypoint corresponding to the global path as coordinates, particularly, interpolated coordinates, by parameterizing a position of a vehicle in a road environment with respect to the arc length. The position verifier 1210 may verify the position on the global path by expressing the position of the vehicle as an arc length and a lateral offset with respect to the global path.

In operation S120, the path candidate group generator 1220 may generate a path candidate group based on the global path. Here, the path candidate group generator 1220 may generate the path candidate group by applying a lateral offset based on the global path. The path candidate group generator 1220 may apply each path candidate group for vehicle control by converting from a Cartesian coordinate system to a curvilinear coordinate system.

The path candidate group generator 1220 may determine, as an obstacle, an object that is not mapped to the HD map among objects determined through a sensor, may compute a difference in the arc length from a current vehicle to each obstacle, and may determining an arc length value of a path depending on presence or absence of the obstacle.

In operation S130, the optimal path selector 1230 may select an optimal path having a smallest cost function related to a global path following from the path candidate group. Here, the cost function may include a cost that follows the global path, that is, a global-path-following cost for selecting a path candidate group having a smallest lateral offset from the global path. That is, the cost function may include a static object cost, a smoothness cost, and a global-path-following cost. Also, the cost function may reflect cut-in and following by including a cost function for a dynamic object. That is, the cost function may include a static object cost, a smoothness cost, a global-path-following cost, and a dynamic object cost, and may be determined by adjusting an importance of each cost. The example embodiments may select an optimal path through an improved cost function by considering a global-path-following cost function and a kinematic cost function that considers a velocity of a dynamic obstacle and a velocity of an ego vehicle.

In particular, the optimal path selector 1230 may determine cut-in and following. In detail, the optimal path selector 1230 may allow driving by reflecting a cost function for a dynamic object and by planning a path that uses cut-in and following for the dynamic object.

In operation S140, the vehicle velocity determiner 1240 may determine a velocity of a vehicle for the selected optimal path.

The example embodiments plan a path after recognizing an object based on a sensor, but also additionally perform path planning using lane information of an HD map, thereby making it easy to follow a global path. The example embodiments focus on a method of determining an optimal path among local paths and maximally following a global path rather than determining driving.

More particularly, the example embodiments add cost for cut-in and following that frequently occur in a real vehicle in consideration of velocity of a dynamic object and also compute a collision point in consideration of a velocity and a position of a current vehicle and a velocity and a position of another vehicle and then do not select a corresponding path as cost greatly increases according to an increase in acceleration or deceleration required for the collision point.

Meanwhile, an HD map-based local path planning method for dynamic and static object avoidance performed by a computer device according to another example embodiment may include generating a path candidate group based on a global path; and selecting an optimal path as a path having a smallest cost function related to a global path following from the path candidate group by defining a cost function related to the global path following. The cost function may include a global-path-following cost for selecting a path candidate group having a smallest lateral offset from the global path.

Also, the selecting of the optimal path may include allowing driving by reflecting a cost function for a dynamic object and by planning a path that uses cut-in and following for the dynamic object.

Description related to an HD map-based local path planning method for dynamic and static object avoidance performed by a computer device according to another example embodiment overlaps the aforementioned description related to an HD map-based local path planning method for dynamic and static object avoidance performed by a computer device according to an example embodiment and thus, further description is omitted. Meanwhile, the HD map-based local path planning method for dynamic and static object avoidance performed by the computer device according to another example embodiment may further include a configuration of the HD map-based local path planning method for dynamic and static object avoidance performed by the computer device according to an example embodiment.

According to example embodiments, the proposed algorithm may perform efficient path planning when an autonomous vehicle is travelling in a complex dynamic environment based on an HD map. Also, according to example embodiments, it is possible to apply to various and complex traffic environments through path planning in consideration of a velocity of a dynamic object.

The systems and/or apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the example embodiments, or they may be well-known and available to those having skill in the computer software arts. Examples of non-transitory computer-readable media include magnetic media such as hard disks, floppy disks, and magnetic tapes; optical media such as CD ROM disks and DVDs; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A high-definition (HD) map-based local path planning method for dynamic and static object avoidance performed by a computer device, the method comprising:
   verifying a position on a global path by parameterizing the global path using an arc length;
   generating a path candidate group based on the global path; and
   selecting an optimal path as a path having a smallest cost function related to a global path following from the path candidate group,
   wherein the cost function includes a global-path-following cost for selecting a path candidate group having a smallest lateral offset from the global path, wherein the generating of the path candidate group comprises determining, as an obstacle, an object that is not mapped to the HD map among objects determined through a sensor, computing a difference in the arc length from a current vehicle to each obstacle, and determining an arc length value of a path depending on presence or absence of the obstacle.

2. The method of claim 1, further comprising:
determining a velocity of a vehicle for the selected optimal path.

3. The method of claim 1, wherein the verifying of the position on the global path comprises interpolating waypoints of the global path generated based on the HD map into a cubic spline curve.

4. The method of claim 1, wherein the verifying of the position on the global path comprises expressing each waypoint corresponding to the global path as coordinates by parameterizing a position of a vehicle in a road environment with respect to the arc length.

5. The method of claim 1, wherein the verifying of the position on the global path comprises verifying the position on the global path by expressing a position of a vehicle as an arc length and a lateral offset with respect to the global path.

6. The method of claim 1, wherein the generating of the path candidate group comprises generating the path candidate group by applying a lateral offset based on the global path.

7. The method of claim 1, wherein the generating of the path candidate group comprises applying each path candidate group for vehicle control by converting from a Cartesian coordinate system to a curvilinear coordinate system.

8. The method of claim 1, wherein the cost function includes a static object cost, a smoothness cost, a global-path-following cost, and a dynamic object cost, and is determined by adjusting an importance of each cost.

9. The method of claim 1, wherein the selecting of the optimal path comprises allowing driving by reflecting a cost function for a dynamic object and by planning a path that uses cut-in and following for the dynamic object.

10. A high-definition (HD) map-based local path planning apparatus for dynamic and static object avoidance, the apparatus comprising:

a position verifier configured to verify a position on a global path by parameterizing the global path using an arc length;
a path candidate group generator configured to generate a path candidate group based on the global path; and
an optimal path selector configured to select an optimal path having a smallest cost function related to a global path following from the path candidate group,
wherein the cost function includes a global-path-following cost for selecting a path candidate group having a smallest lateral offset from the global path,
wherein the path candidate group generator is configured to determine, as an obstacle, an object that is not mapped to the HD map among objects determined through a sensor, to compute a difference in the arc length from a current vehicle to each obstacle, and to determine an arc length value of a path depending on presence or absence of the obstacle.

11. The apparatus of claim 10, further comprising:
a vehicle velocity determiner configured to determine a velocity of a vehicle for the selected optimal path.

12. The apparatus of claim 10, wherein the position verifier is configured to express each waypoint corresponding to the global path as coordinates by parameterizing a position of a vehicle in a road environment with respect to the arc length.

13. The apparatus of claim 10, wherein the position verifier is configured to verify the position on the global path by expressing a position of a vehicle as an arc length and a lateral offset with respect to the global path.

14. The apparatus of claim 10, wherein the path candidate group generator is configured to generate the path candidate group by applying a lateral offset based on the global path.

15. The apparatus of claim 10, wherein the cost function includes a static object cost, a smoothness cost, a global-path-following cost, and a dynamic object cost, and is determined by adjusting an importance of each cost.

16. The apparatus of claim 10, wherein the optimal path selector is configured to allow driving by reflecting a cost function for a dynamic object and by planning a path that uses cut-in and following for the dynamic object.

\* \* \* \* \*